Aug. 4, 1970 A. GOETZBERGER ET AL 3,523,190

MOS PHOTODETECTOR HAVING DUAL GATE ELECTRODES

Filed Oct. 17, 1968

INVENTORS A. GOETZBERGER
E. H. NICOLLIAN

BY H W Lockhart
ATTORNEY

United States Patent Office 3,523,190

Patented Aug. 4, 1970

3,523,190

MOS PHOTODETECTOR HAVING DUAL GATE ELECTRODES

Adolf Goetzberger, Freiburg in Brisgau, Germany, and Edward H. Nicollian, Murray Hill, N.J., assignors to Bell Telephone Laboratories, Incorporated, Murray Hill, N.J., a corporation of New York Filed Oct. 17, 1968, Ser. No. 768,467
Int. Cl. H01j *39/12;* H01l *15/00;* H03k *3/42*
U.S. Cl. 250—211 10 Claims

ABSTRACT OF THE DISCLOSURE

A photodetector comprises an MOS structure having two separated, relatively small, with respect to the oxidized area, gate electrodes plus the usual ohmic contact to the semiconductor body. An inherent surface inversion layer at the oxide interface is depleted of carriers by application of a large repetitive pump signal at one gate electrode thus rendering the entire oxidized area very light sensitive. The other gate electrode provides a means of detecting impinging light and may be operated either in an integrating mode or a compensating mode.

This invention relates to photodection by means of a semiconductor device and more particularly by devices of the metal oxide-semiconductor (MOS) type.

The photosensitivity of semiconductor devices is well known and relatively well understood. The detection of light using a semiconductor device is based on the generation of hole-electron pairs by the light within the semiconductor bulk giving rise to a photovoltage or photocurrent in a PN junction structure or to a change in capacitance in a suitably biased MOS structure. In this disclosure the term light refers not only to the visible portion of the electromagnetic radiation spectrum but to the infra-red and ultra-violet segments.

In accordance with this invention photodetection occurs as a consequence of sensitized surface induced at the oxide-semiconductor interface. In particular, photosensitivity is attained by depleting a surface inversion layer of carriers by pumping a gate electrode located within a much larger oxidized area with a large repetitive signal. In this context such a signal may comprise a series of pulses, a sinusoidal wave or the like. Significant to the operation of the photodetector is the pre-existence of an inversion layer at the semiconductor surface under the oxide resulting from built-in oxide charge. It is important also to have moderate surface state density. Thermal generation of minority carriers from the space charge volume desirably should be low inasmuch as it is a countering effect to the carrier generation from incident radiation on the sensitized surface.

The intensity of incident radiation is observed by a second capacitance monitoring gate electrode on the oxidized portion. Detection may be done in at least two different modes, an integrating mode and a compensating mode. In the integrating mode filling of the initially depleted channel is observed. In the compensating mode the pumping frequency is varied to compensate the incident radiation intensity.

Accordingly, in contradistinction to MOS devices previously known for light detection, the device in accordance with this invention does not require transparent metal contacts, having available rather a large light sensitive area covered only by a thin film of transparent oxide. Moreover, it is relatively simple to fabricate. Also, inasmuch as the space charge layer is at the surface, loss of light intensity from surface diffused layers such as are present in prior art photodiodes do not occur.

The recombination of photo-generated carriers cannot occur because minority carriers are in thermodynamic equilibrium at the surface. The reason for this is that the pumping is generating a nonequilibrium condition which the incident light is restoring.

Figure 1:
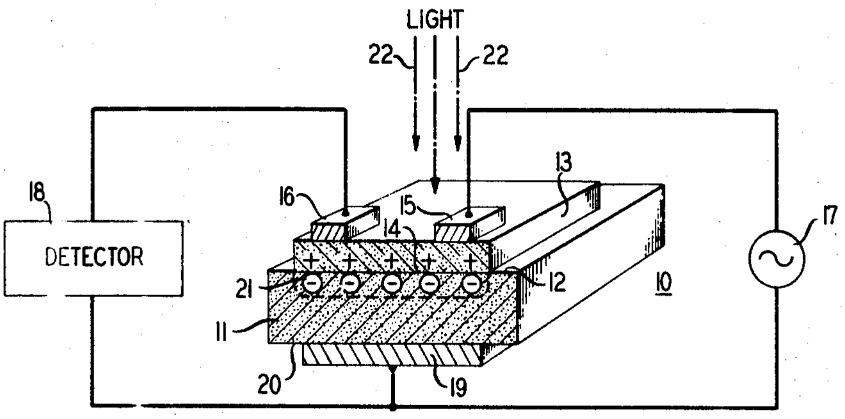
Figure 2:
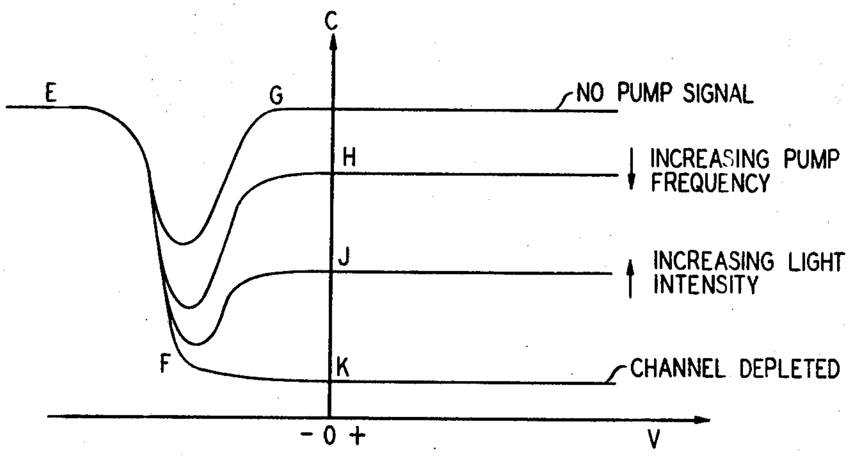

The invention and its objects and features will be clearly understood from the more detailed description which follows when taken in conjunction with the drawing in which FIG. 1 shows in schematic form an MOS photodetector in one arrangement in accordance with this invention; and FIG. 2 is a graph showing the effect of applied voltage upon capacitance at a detecting electrode for various operating conditions of a photodetector in accordance with this invention.

Referring to FIG. 1, a schematic circuit arrangement is shown connected to one form of MOS photodetector 10. The photodetector 10 comprises a body 11 of p-type monocrystalline silicon semiconductor material. On one surface 12 of the body is a dielectric film 13 of silicon dioxide. The character of this film 13 is such as to produce a surface inversion layer 14 in the portion of the body 11 contiguous with the surface 12 which adjoins the film 13. The formation and character of this surface inversion layer will be more fully explained hereinafter.

Atop the film 13 are a pair of gate electrodes 15 and 16. The first gate electrode 15 comprises a small, metallic layer which is of considerably smaller extent than the dielectric film 13. To this first gate electrode is connected a source 17 of a large repetitive pump signal. The second gate electrode 16 is similar in structure to the first gate electrode but is adapted for connection to a detector 18 for observing the capacitance of the second gate electrode 16 with respect to the dielectric film 13 and semiconductor body 11. The semiconductor device structure is substantially completed by an ohmic or low resistance contact 19 applied to the opposite surface 20 of the semiconductor body 11.

By way of understanding the operation of the photodetector apparatus of FIG. 1, the device in the quiescent condition comprises a surface varactor having an equilibrium surface inversion. The surface inversion condition is one in which, for the p-type conductivity silicon specified, holes have been repelled from the surface 12, leaving exposed ionized acceptors. Generated electrons accumulate at the interface resulting in an inversion condition of charge, in other words, the surface charge is now opposite in sign to the normal bulk carriers. More specifically, and with reference to the paper entitled "Semiconductor Surface Varactor," R. Lindner, Bell System Technical Journal, vol. 41, p. 803, May 8, 1962, the capacitance observed at the second gate electrode, with a negative voltage applied to the first gate electrode 15, will be that represented by the value on the curve at point E, or substantially the capacitance of the oxide film alone. As the field plate voltage changes in the positive direction, the capacitance first drops to the value represented generally on the curve by point F as the field effectively increases the width of the space charge layer and thereby reduces the capacity from the value of the oxide capacity. Further increase in the field plate voltage in the positive direction causes a return and an increase of the inversion condition of charge and this inversion layer under the field electrode in effect connects the current path into the adjoining space charge layer thus increasing the capacitor area and the capacity again approaches the oxide capacity as a limit as represented at the point G on the upper curve.

The built-in inversion condition may be produced by suitably growing or treating the dielectric film. Typically, thermally grown silicon dioxide films on p-type silicon in which the surface has been suitably treated so as to ensure a moderate surface state density and a surface inversion layer is naturally produced. Alternatively, impurities may be controllably introduced during the formation of the dielectric film whether by thermal growth means or by deposition techniques so as to produce the desired surface inversion layer.

Further, by way of understanding the operation of the device, the detection of incident light as represented by the vertical arrowed lines 22 is a consequence of applying a large repetitive pump signal to the first gate electrode 15. By application of the large repetitive signal the surface potential of the capacitor comprising the electrode 15, dielectric film 13 and semiconductor 11 alternates between the inversion and accumulation conditions. The result of this alternation is the complete depetion of carriers from the surface adjacent channel. This condition is represented by the curve K in the graph of FIG. 2, and is detected at electrode 16. In this condition the surface 12 of the semiconductor body 11 underlying the dielectric film 13 is very sensitive to photon generated electron hole pairs. Curves J and H can also be used as operating levels. Inasmuch as the gate electrodes 15 and 16 only need be of restricted extent as compared with the oxidized area and inasmuch as the dielectric film 13 is typically of the order of 1000 A. in thickness, the photosensitive surface is most advantageously exposed to incident radiation. In particular, a relatively large area is available with no need for transparent or semitransparent metal contacts. In a typical device the area of the dielectric oxide film corresponded to a circle 0.2 cm. in diameter with a pair of gate electrodes each $3.8 \times 10^{-2}$ cm. in diameter.

The device of FIG. 1 may be conveniently operated in two different modes, the integrating mode and the compensating mode.

In the integrating mode the surface channel is entirely depleted of carriers by pumping with a large repetitive signal, which is then turned off for the integrating period. The accumulation of charge as a consequence of incident radiation in the surface region from the generation of hole electron pairs is monitored by measuring the capacitance of the second gate electrode 16. This may be done by any one of several techniques including the use of a capacitance bridge to detect the rise to a particular capacitance value during a measurable exposure time. Depending on the conditions of operation the integrating period may be short or long, for example, a millisecond or an hour. Referring to FIG. 2, in the integrating mode the operation begins with the condition represented by the portion of the curve denoted K, in which the channel is completely depleted. The incidence of light produces an increase in capacitance represented by a rise to the curves labeled J and higher.

The compensating mode, as the name indicates, is one in which the frequency of the pump signal is varied so as to balance the minority carrier current generated by the incident light. Thus, again with reference to the graph of FIG. 2, increasing light intensity tends to produce an increase in capacitance whereas increasing pump frequency tends to produce a decrease in capacitance. Again, a capacitance bridge may be arranged as a detector and a null condition maintained at the bridge will enable the applied pump frequency to be observed as a measure of the intensity of the incident radiation.

It will be appreciated that the two gate electrodes are not A.C. isolated and therefore pumping and detection functions should be separated in order to prevent the large pump signal from submerging or "swamping out" the detection signal. For example, when the pump signal is applied the detector should be off. Or the light input itself may be chopped so as to be out of phase with the detection. Most advantageously, in this respect, the pump signal frequency should be several orders of magnitude different from the detection signal frequency, for example one hundred times greater or less.

The integrating mode is particularly useful for the observation of very low light levels, particularly if the device is arranged for very low thermal generation rates. This may be done in the case of silicon by reducing the temperature of the semiconductor body or use may be made of other semiconductor materials having a much wider bandgap from that of silicon. It will be understood that the thermal generation rate from the semiconductor body affects the sensitivity inasmuch as carriers so generated tend to counter or swamp out the effect of photon generated carriers. In particular, by cooling silicon to liquid nitrogen temperature, for example 77° K., the generation rate may be rendered so low that the device remains in the pumped or channel-depleted state for many hours.

Moreover, in addition to silicon the principles in accordance with this invention may be utilized in connection with the other well-known Group IV elemental semiconductor germanium, as well as the semiconductor compounds of the Group III-Group V and Group II–Group VI combinations.

The device, in accordance with this invention, is suitable as an efficient and sensitive radiation detection device and may be adapted to a wide range of uses. In addition to the typical applications involving the detection of light beams for signaling purposes or the observation of light intensities over a period of time, devices in accordance with the principles of the invention may be adapted to image detection of the type employed in vidicon image converters.

Moreover, although the device has been described in terms of two gate electrodes, one for applying a pump signal and another for detecting the capacitance effected by the incident radiation, it will be understood that, particularly for the integrating mode, the device may be constructed with a single gate electrode having the dual functions of pumping and detection. Moreover, although the device has been described as having a limited area of dielectirc film, the same effect may be achieved in a larger device entirely covered by dielectric layer in which the active photodetector is defined by an additional circumferential electrode suitably biased to the pinch-off condition, thus defining an active portion of the dielectric film. The pumping and detecting electrodes will be located within this circumferential electrode.

Although the invention has been described in terms of certain specific embodiments it will be understood that variations may be made by those skilled in the art which likewise fall within the scope and spirit of the claims.

What we claim is:

1. Semiconductor apparatus for detecting light comprising a semiconductor body of one conductivity type, a dielectric film substantially transparent to light on at least one surface of said body, a surface inversion layer in said body adjoining said dielectric film, a first metal gate electrode on a portion of said film small in comparison to the total extent of said film, a second metal gate electrode on another portion of said film spaced apart from said first electrode and likewise small in comparison to the total extent of said film, and a separate low resistance electrode connection to said semiconductor body.

2. Semiconductor apparatus in accordance with claim 1 in which said semiconductor body is of a material selected from the class consisting of silicon, germanium and the Group III-Group V and Group II-Group VI semiconductor compounds.

3. Semiconductor apparatus in accordance with claim 1 in which said semiconductor body is of *p* type conductivity silicon and said dielectric film is of thermally grown silicon oxide.

4. Semiconductor apparatus for detecting light comprising a body of semiconductor material of one conductivity type, a thin dielectric film on a surface of said body, an equilibrium surface inversion layer in said semiconductor body at said surface contiguous with said film, an ohmic electrode to said body, a first gate electrode on said film for applying a repetitive pump signal, said first gate electrode being relatively much smaller in area than the area of said film, a second gate electrode on said film spaced apart from said first gate electrode for observing the capacitance across said second gate electrode and the semiconductor body, said second gate electrode being comparable in area to said first gate electrode.

5. Semiconductor apparatus in accordance with claim 4 in which said semiconductor body is of a material selected from the class consisting of silicon, germanium and the Group III-Group V and Group II-Group VI semiconductor compounds.

6. Semiconductor apparatus in accordance with claim 4 in which said body is of silicon and said dielectric film is of silicon dioxide.

7. Semiconductor apparatus in accordance with claim 6 in which said body is of *p* type conductivity and said silicon dioxide is thermally grown.

8. Semiconductor apparatus in accordance with claim 1 including first means for applying a repetitive pump signal to said first gate electrode and a second detector means connected to said second gate electrode for detecting the capacitance of said second gate electrode with respect to said semiconductor body.

9. Semiconductor apparatus in accordance with claim 8 in which said semiconductor body is one of a material selected from the group consisting of silicon, germanium and the Group III-Group V and Group II-Group VI compounds.

10. Semiconductor apparatus in accordance with claim 8 in which said semiconductor body is of *p* type silicon and said dielectric film is of thermally grown silicon dioxide having a thickness of about 1000 A.

References Cited

UNITED STATES PATENTS 3,459,944 6/1969 Triebwasser -------- 250—211

A. R. BORCHELT, Primary Examiner

T. N. GRIGSBY, Assistant Examiner

U.S. Cl. X.R.

307—311; 317—235, 127